(12) United States Patent  
Merino Almeida et al.

(10) Patent No.: US 9,776,465 B2
(45) Date of Patent: Oct. 3, 2017

(54) ROLLING TRAILER HITCH COVER ASSEMBLY

(71) Applicant: FORD GLOBAL TECHNOLOGIES, LLC, Dearborn, MI (US)

(72) Inventors: Carlos Emilio Merino Almeida, Benito Juarez (MX); Jonatan Leff Yaffe, Mexico City (MX); Jorge Manuel Rodriguez Vazquez, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/943,537

(22) Filed: Nov. 17, 2015

(65) Prior Publication Data
US 2017/0136838 A1    May 18, 2017

(51) Int. Cl.
*B60D 1/60* (2006.01)
*B60D 1/56* (2006.01)
*B60D 1/54* (2006.01)

(52) U.S. Cl.
CPC ............ *B60D 1/605* (2013.01); *B60D 1/54* (2013.01); *B60D 1/56* (2013.01); *B60D 1/60* (2013.01)

(58) Field of Classification Search
CPC ... B60D 1/54; B60D 1/56; B60D 1/60; B60D 1/605
See application file for complete search history.

(56) References Cited

U.S. PATENT DOCUMENTS

| | | | | |
|---|---|---|---|---|
| 2,752,170 A | * | 6/1956 | Eversole | B60D 1/60 280/502 |
| 4,109,930 A | * | 8/1978 | Pilhall | B60R 19/48 280/491.4 |
| 4,256,324 A | * | 3/1981 | Hamilton | B60D 1/54 280/415.1 |
| 4,432,581 A | * | 2/1984 | Guma | B60J 11/02 135/88.07 |
| 4,727,898 A | * | 3/1988 | Guma | B60J 11/02 135/87 |
| 4,848,823 A | * | 7/1989 | Flohr | B60J 11/02 160/310 |
| 4,856,842 A | * | 8/1989 | Ross | B60J 11/02 150/166 |
| 4,929,016 A | * | 5/1990 | Kastanis | B60J 11/02 296/136.03 |
| 5,489,111 A | * | 2/1996 | Collins | B60D 1/52 280/491.5 |
| 5,597,196 A | * | 1/1997 | Gibbs | B60J 11/02 160/326 |

(Continued)

FOREIGN PATENT DOCUMENTS

FR       2569623 A1 * 3/1986 ............... B60D 1/54
GB       1023855 A  * 3/1966 ............... B60D 1/60

*Primary Examiner* — Joseph M Rocca
*Assistant Examiner* — Maurice L Williams
(74) *Attorney, Agent, or Firm* — Jason Rogers; King & Schickli, PLLC (57) ABSTRACT

A trailer hitch cover assembly is provided. That trailer hitch cover assembly includes a roller and a flexible cover that is received on the roller. The flexible cover is displaceable between a retracted position wherein the flexible cover is wound onto the roller so as to provide access to a hitch receiver and a deployed position wherein the flexible cover extends from the roller so as to conceal the hitch receiver.

14 Claims, 5 Drawing Sheets

(56) References Cited

U.S. PATENT DOCUMENTS

| | | | |
|---|---|---|---|
| 5,628,536 A | 5/1997 | Fulkerson | |
| 5,823,607 A * | 10/1998 | Hindson | B60J 11/02 160/370.21 |
| 5,947,506 A | 9/1999 | Bauer | |
| 6,019,386 A | 2/2000 | Morelock | |
| 6,189,910 B1 | 2/2001 | Bartel | |
| 6,428,031 B1 * | 8/2002 | McCoy | B60D 1/075 224/519 |
| 6,439,595 B1 | 8/2002 | Cheng et al. | |
| 6,874,806 B1 | 4/2005 | Blake | |
| 6,908,096 B2 | 6/2005 | Lewis et al. | |
| 6,916,043 B2 * | 7/2005 | Rhea | B60J 11/06 280/770 |
| 6,969,084 B2 | 11/2005 | Kaepp et al. | |
| 7,055,844 B1 * | 6/2006 | Bostedt | B60D 1/54 224/403 |
| 7,338,100 B2 * | 3/2008 | Meyer | B60R 19/44 150/166 |
| 7,464,982 B1 * | 12/2008 | Lin | B60J 11/02 296/136.01 |
| 7,967,366 B1 * | 6/2011 | Tellez | B60J 11/02 296/136.02 |
| 2006/0232095 A1 * | 10/2006 | Sedighzadeh | B60J 11/02 296/98 |
| 2013/0134690 A1 * | 5/2013 | Kim | B60D 1/06 280/491.1 |
| 2013/0147157 A1 * | 6/2013 | Lee | B60D 1/54 280/491.1 |
| 2016/0176251 A1 * | 6/2016 | Mutlu | B60D 1/065 280/491.3 |

\* cited by examiner

ROLLING TRAILER HITCH COVER ASSEMBLY

TECHNICAL FIELD

This document relates generally to the motor vehicle equipment field and, more particularly, to a trailer hitch cover assembly including a flexible cover and a roller.

BACKGROUND

Many individuals utilize their motor vehicles to tow trailers laden with such items as boats, personal watercraft, all-terrain vehicles, motorcycles, camping equipment and the like. Thus receiver-type trailer hitches have become increasingly popular and are now provided on all types of motor vehicles including not only pickup trucks but also sport utility vehicles, crossover vehicles, minivans, station wagons and even sedans. Typically the trailer hitch receivers are provided in a recess behind the motor vehicle bumper. A trailer hitch cover is provided over the trailer hitch receiver when not in use in order to increase visual styling and aesthetic appeal of the motor vehicle.

This document relates to a new and improved trailer hitch cover assembly incorporating an aesthetically pleasing rolling cover that is easy to use.

SUMMARY

In accordance with the purposes and benefits described herein, a trailer hitch cover assembly is provided. That trailer hitch cover assembly comprises a roller and a flexible cover received on the roller. The flexible cover is displaceable between a retracted position wherein the flexible cover is wound onto the roller so as to provide access to a hitch receiver and a deployed position wherein the flexible cover extends from the roller so as to conceal the hitch receiver.

The trailer hitch cover assembly may include a guide track for engaging and guiding the flexible cover as the flexible cover is displaced between the retracted position and the deployed position. In one possible embodiment a spring is provided for biasing the roller and the flexible cover into the deployed position wherein the cover covers and conceals the hitch receiver.

In another possible embodiment the trailer hitch cover assembly includes a drive motor connected to the roller for displacing the cover between the retracted position and the deployed position. A controller may be provided for controlling operation of the drive motor.

In accordance with yet another aspect, a motor vehicle is provided. That motor vehicle comprises a bumper fascia with a hitch opening and a hitch receiver carried in the hitch opening. Further the motor vehicle includes a trailer hitch cover assembly including a roller and a flexible cover received on the roller. That cover is displaceable between a retracted position wherein the cover is wound onto the roller and the hitch opening is open and a deployed position wherein the cover extends from the roller, closes the hitch opening and conceals the hitch receiver.

The trailer hitch cover assembly may also include a guide track for engaging and guiding the flexible cover as the flexible cover is displaced between the retracted position and the deployed position. In one possible embodiment such a guide track comprises a first channel and a second channel. The first channel is opposed to the second channel and the flexible cover includes a first margin received and held for sliding movement through the first channel and a second, opposite margin received and held for sliding movement through the second channel. In one possible embodiment, the first margin includes a first guide wire received in the first channel and the second margin includes a second guide wire received in the second channel.

In one possible embodiment, a spring is provided for biasing the roller and the flexible cover into the deployed position closing the hitch opening and concealing the hitch receiver. This trailer hitch cover assembly may also include a latch mechanism for holding the cover in the retracted position wherein the hitch opening is opened to allow access to the hitch receiver.

In yet another embodiment, the trailer hitch cover assembly includes a drive motor for driving the roller and displacing the flexible cover between the retracted position and the deployed position. An actuator may be connected to the drive motor in order to activate and deactivate the drive motor and displace the cover between the retracted and deployed positions. In another possible embodiment, a controller is connected to the drive motor. That controller may include a human interface such a touch screen display.

In accordance with still another aspect, a method is provided of covering a hitch receiver in a motor vehicle. That method may be broadly described as comprising the steps of winding a cover onto a roller to expose and allow one to access the hitch receiver and unwinding the cover from the roller to cover and conceal the hitch receiver. In one possible embodiment, the method includes biasing the cover toward a closed position covering and concealing the hitch receiver by means of a spring. In another possible embodiment, the method includes driving the cover between a retracted position and a deployed position by means of a drive motor.

In the following description, there are shown and described several preferred embodiments of the trailer hitch cover assembly and motor vehicle incorporating such a trailer hitch cover assembly. As it should be realized, the trailer hitch cover assembly and motor vehicle are capable of other, different embodiments and their several details are capable of modification in various, obvious aspects all without departing from the trailer hitch cover assembly and motor vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the trailer hitch cover assembly (as well as a motor vehicle incorporating that trailer hitch cover assembly) and together with the description serve to explain certain principles thereof. In the drawing figures.

Reference will now be made in detail to the present preferred embodiments of the trailer hitch cover assembly, examples of which are illustrated in the accompanying drawing figures.

DETAILED DESCRIPTION

Figure 1:
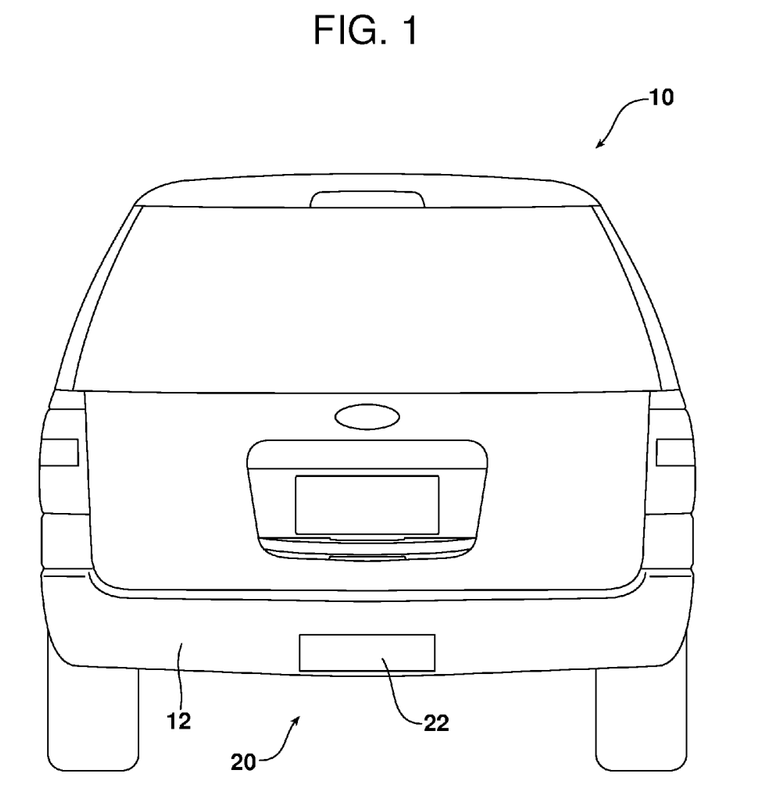
FIG. 1 is a rear elevational view illustrating the cover of the trailer hitch cover assembly in a deployed or closed position wherein the cover conceals a hitch receiver.
Figure 2:
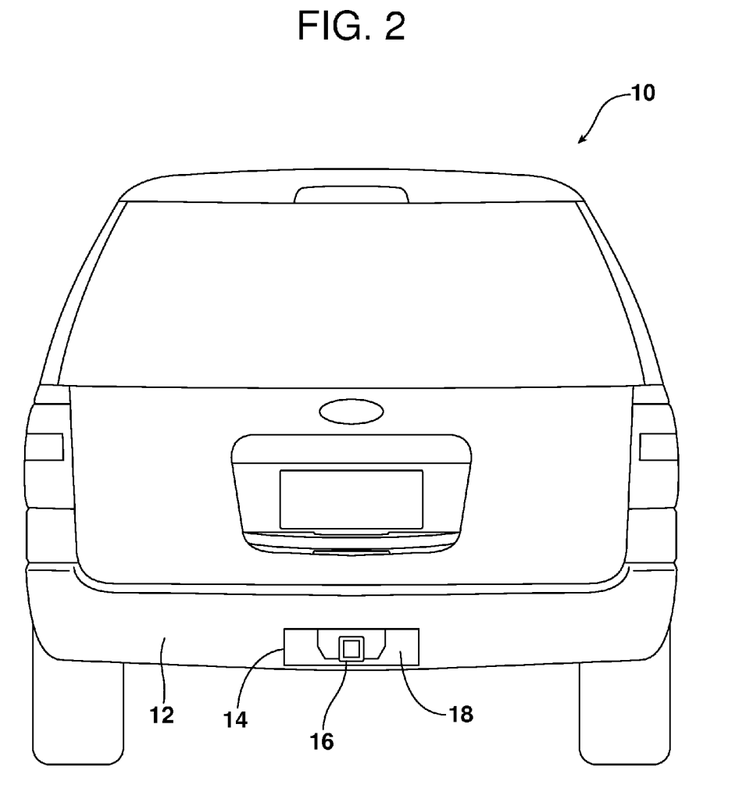
FIG. 2 is a view similar to FIG. 1 but illustrating the cover of the trailer hitch cover assembly in a retracted position wherein the hitch receiver is accessible for use.

Reference is now made to FIGS. 1 and 2 illustrating a motor vehicle 10 including a bumper fascia 12 having a hitch opening 14. A hitch receiver 16 is carried in the hitch opening 14 in a recess 18 behind the bumper fascia 12.

A trailer hitch cover assembly 20 is displaceable between a deployed position wherein a flexible cover 22 of the trailer hitch cover assembly 20 closes the hitch opening 14 in the bumper fascia 12 and conceals the hitch receiver 16 (FIG. 1) and a retracted position wherein the hitch opening 14 is open and the hitch receiver 16 may be accessed through that opening (FIG. 2).

Figures 3, 4:
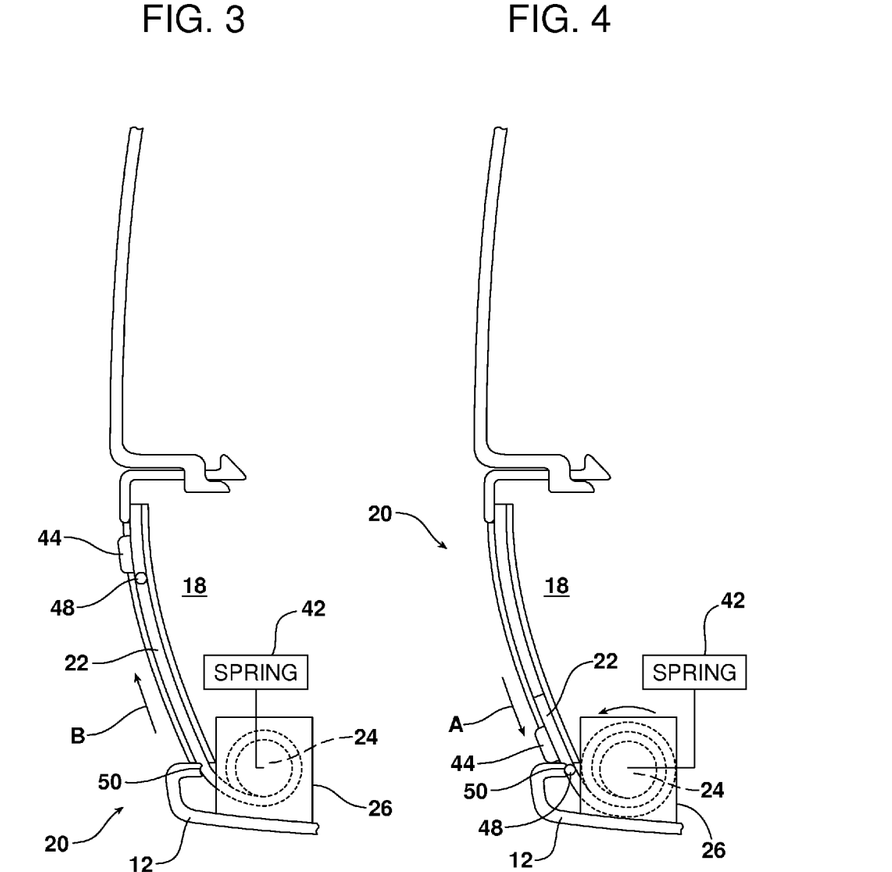
FIGS. 3 and 4 are respective schematic side views illustrating the cover in the retracted and deployed positions.
Figure 5:
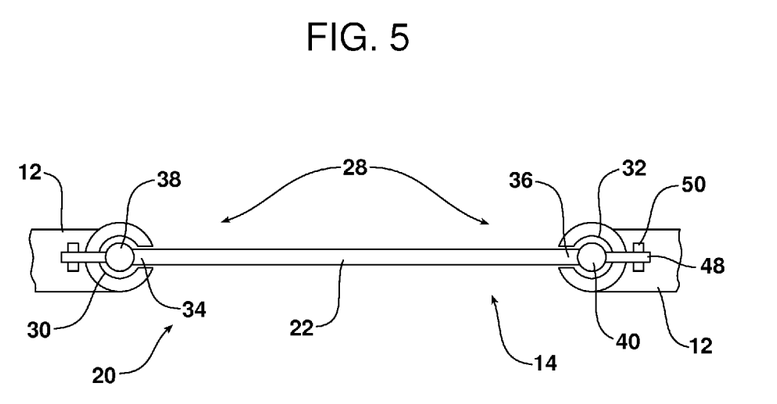
FIG. 5 is a transverse schematic view illustrating the guide track, in the form of two opposed channels, that receives the opposed margins of the cover and guides the cover as it is moved between the retracted and deployed positions.

As best illustrated in FIGS. 3-5, the trailer hitch cover assembly 20 also includes a roller 24 carried for rotation with respect to a roller mount 26 on the bumper fascia 12. As should be appreciated, the flexible cover 22 is wound onto the roller 24 to expose and allow one to access the hitch receiver 16 and unwound from the roller to cover and conceal the hitch receiver.

As best illustrated in FIG. 5, the trailer hitch cover assembly 20 includes a guide track 28. In the illustrated embodiment, the guide track 28 comprises a first channel 30 and a second channel 32 carried on the bumper fascia 12 at opposite ends of the hitch opening 14. As illustrated the two channels 30, 32 are opposed to each other.

As also illustrated in FIG. 5, a flexible cover 22 includes a first margin 34 and a second margin 36. The first margin 34 is received and slides through the first channel 30 while the second margin 36 is received and slides through the second channel 32 as the cover 22 is displaced between the retracted and deployed positions.

In the illustrated embodiment of FIG. 5, the first margin 34 includes a first guide wire 38 and the second margin 36 includes a second guide wire 40. As should be appreciated, the first guide wire 38 is captured in the first channel 30 and the second guide wire 40 is captured in the second channel 32. Further, those channels 30, 32 are sized and shaped to allow free sliding movement of the margins 34, 36 and the guide wires 38, 40 through the channels while preventing any kinking of the guide wires. In this way, the flexible cover 22 is maintained in a stretched condition extending entirely across the width of the hitch opening 14 between the two channels 30, 32.

In the embodiment illustrated in FIGS. 3-5, the trailer hitch cover assembly 20 also includes a spring 42 connected to the roller 24. The spring 42 functions to bias the cover 22 toward the deployed position wherein the cover closes the hitch opening 14 and conceals the hitch receiver (see FIG. 1).

In this embodiment, one opens the cover 22 to obtain access to the hitch receiver 16 by engaging the finger hold 44 on the front face of the cover and displacing the cover downward in the direction of action arrow A (see FIG. 4) until the latch mechanism 46 is engaged to hold the cover in the retracted position. That latch mechanism 46 comprises opposed lugs 48 on the cover 20 that engage in cooperating resilient sockets 50 mounted on the bumper fascia 12. The latch mechanism 46 provides sufficient force to hold the cover 22 in the open position against the biasing spring 42. When one wishes to again close the cover 22, one engages the finger hold 44 and pulls upwardly (note action arrow B in FIG. 3) with sufficient force to snap the lugs 48 out of the sockets 50. The spring 42 then biases and holds the cover 22 in the fully deployed position closing the hitch opening 14 and concealing the hitch receiver 16.

Figure 6:
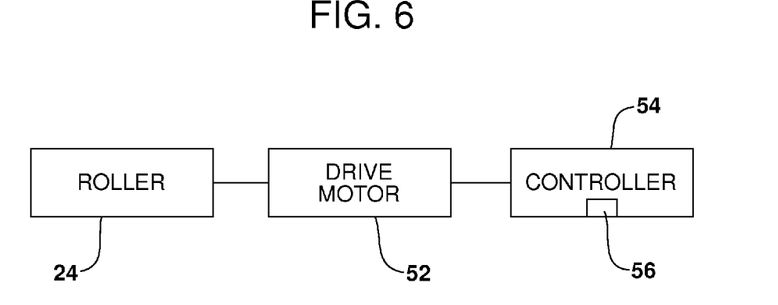
FIG. 6 is a block diagram of an alternative embodiment of the trailer hitch cover assembly that includes a drive motor and controller.

In an alternative embodiment illustrated in FIG. 6, the trailer hitch cover assembly 20 includes a drive motor 52 instead of the spring 42. The drive motor 52 drives the roller 24 in order to displace the flexible cover 22 between the retracted and deployed positions illustrated in FIGS. 1 and 2.

More specifically, the drive motor 52 is connected to a controller 54 that controls the operation of the drive motor. The controller 54 may comprise a computing device such as a dedicated microprocessor or an electronic control unit (ECU) operating in accordance with instructions provide by appropriate control software. Such a controller 54 may include one or more processors, one or more memories and one or more network interfaces that communicate with each other over a communication bus.

In the embodiment illustrated in FIG. 6, the controller 54 includes a human interface 56. That human interface 56 may take the form of a simple actuator switch. In an alternative embodiment, that human interface 56 may take the form of a touch screen display such as may be provided on the center console of the motor vehicle. In either embodiment, an operator may utilize the human interface 56 to retract or deploy the cover 22 thereby either opening the hitch opening 14 to have access to the hitch receiver 16 or closing the hitch opening to conceal the hitch receiver.

As should be appreciated, the trailer hitch cover assembly 20 is closely associated with a method of covering and concealing a hitch receiver 16 on a motor vehicle 10. That method includes the steps of: (a) winding the cover 22 onto a roller 24 to expose and allow one to access the hitch receiver 16 and (b) unwinding the cover from the roller to cover and conceal the hitch receiver. As noted above, in one possible embodiment, that method further includes biasing the cover 22 toward a closed or deployed position covering and concealing the hitch receiver 16 by means of a spring 42. In another possible embodiment that method includes driving the cover 22 between a retracted position and a deployed position by means of a drive motor 52.

The trailer hitch cover assembly 20 provides a number of benefits and advantages. Smooth and consistent operation is ensured by providing a flexible cover 22 that is wound onto and unwound from a roller 24 when displaced between retracted and deployed positions. Significantly, when retracted, the cover 22 is held within the recess 18 in the bumper fascia 12 where it is protected to some degree from the wind and the elements.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A trailer hitch cover assembly, comprising:
   a roller;
   a flexible cover received on said roller and displaceable between a retracted position wherein said flexible cover is wound onto said roller so as to provide access to a hitch receiver and a deployed position wherein said flexible cover extends from said roller so as to conceal said hitch receiver;
a guide track for engaging and guiding said flexible cover as said flexible cover is displaced between said retracted position and said deployed position; and
a spring biasing said roller and said flexible cover into said deployed position.

2. The trailer hitch cover assembly of claim 1, further including a drive motor connected to said roller for displacing said cover between said retracted position and said deployed position.

3. The trailer hitch cover assembly of claim 2, including a controller for controlling operation of said drive motor.

4. A motor vehicle, comprising:
a bumper fascia with a hitch opening;
a hitch receiver carried in said hitch opening;
a trailer hitch cover assembly including a roller and a flexible cover received on said roller and displaceable between a retracted position wherein said cover is wound onto said roller and said hitch opening is open and a deployed position wherein said cover extends from said roller, closes said hitch opening and conceals said hitch receiver, wherein said trailer hitch cover assembly further includes a guide track for engaging and guiding said flexible cover as said flexible cover is displaced between said retracted position and said deployed position, and wherein said guide track comprises a first channel and a second channel; and
a spring biasing said roller and said flexible cover into said deployed position.

5. The motor vehicle of claim 4, wherein said first channel is opposed to said second channel and said flexible cover includes a first margin received and held in said first channel and a second, opposite margin received and held in said second channel.

6. The motor vehicle of claim 5, wherein said first margin includes a first guide wire received in said first channel and said second margin includes a second guide wire received in said second channel.

7. The motor vehicle of claim 5, further including a drive motor for driving said roller and displacing said flexible cover between said retracted position and said deployed position.

8. The motor vehicle of claim 7, including an actuator connected to said drive motor.

9. The motor vehicle of claim 7, including a controller connected to said drive motor.

10. The motor vehicle of claim 9, wherein said controller includes a human interface.

11. The motor vehicle of claim 10, wherein said human interface is a touch screen display.

12. The motor vehicle of claim 4, further including a latch mechanism for holding said cover in said retracted position.

13. A method of covering a hitch receiver on a motor vehicle, comprising:
winding a cover onto a roller to expose and allow one to access said hitch receiver;
unwinding said cover from said roller to cover and conceal said hitch receiver; and
biasing said cover toward a closed position covering and concealing said hitch receiver by means of a spring.

14. The method of claim 13, including driving said cover between a retracted position and a deployed position by means of a drive motor.

* * * * *

UNITED STATES PATENT AND TRADEMARK OFFICE
CERTIFICATE OF CORRECTION

PATENT NO.        : 9,776,465 B2                                    Page 1 of 1
APPLICATION NO.   : 14/943537
DATED             : October 3, 2017
INVENTOR(S)       : Carlos Emilio Merino Almeida et al.

It is certified that error appears in the above-identified patent and that said Letters Patent is hereby corrected as shown below:

In the Claims

In Claim 2 at Column 5, Line 9, please replace "claim1" with ---claim 1---

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*